Figure 1:
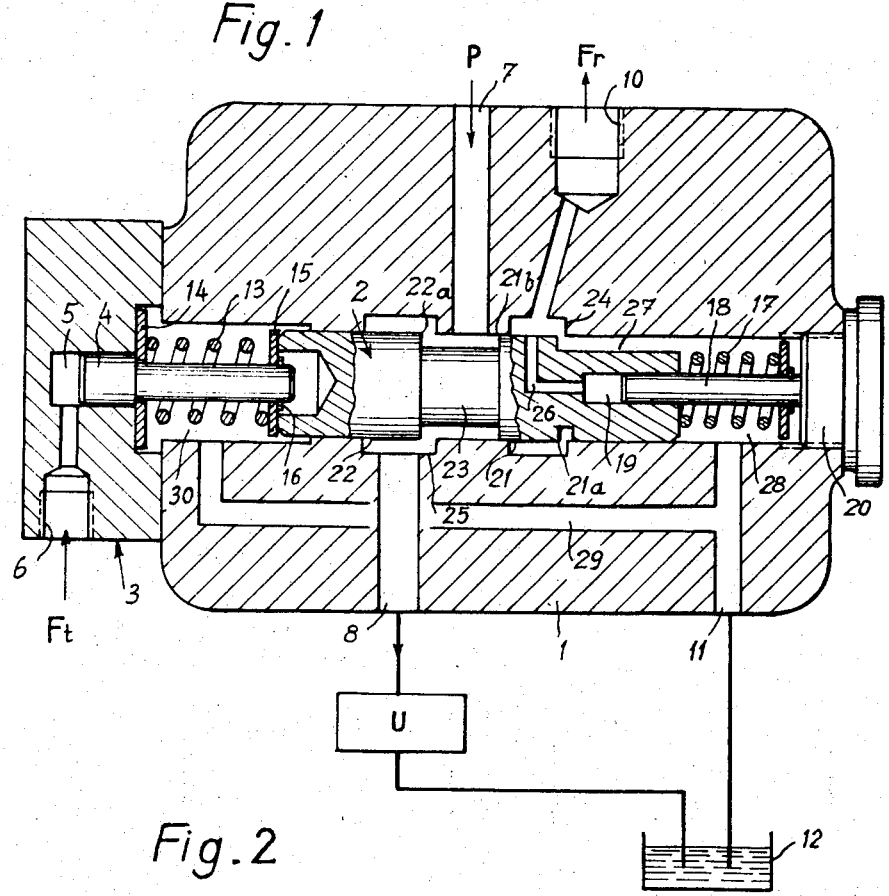

Dec. 26, 1967  G. DE COYE DE CASTELET  3,360,303
SYSTEM FOR CONTROLLING THE BRAKING OF A VEHICLE TRAILER
BY A FLUID CIRCUIT WHICH IS INDEPENDENT OF THE TOWING
VEHICLE BRAKE CIRCUIT AND UTILIZED FOR AT LEAST ONE
OTHER FUNCTION IN ADDITION
Filed May 9, 1966

United States Patent Office 3,360,303
Patented Dec. 26, 1967

3,360,303
SYSTEM FOR CONTROLLING THE BRAKING OF A VEHICLE TRAILER BY A FLUID CIRCUIT WHICH IS INDEPENDENT OF THE TOWING VEHICLE BRAKE CIRCUIT AND UTILIZED FOR AT LEAST ONE OTHER FUNCTION IN ADDITION
Gaetan de Coye de Castelet, Billancourt, France, assignor to Regie Nationale des Usines Renault, Billancourt, France
Filed May 9, 1966, Ser. No. 548,671
Claims priority, application France, May 22, 1965, 18,066
2 Claims. (Cl. 303—7)

This invention relates to a system for controlling the braking on a vehicle trailer by means of a fluid circuit which is independent of the towing vehicle brake circuit and provides the motive power for at least one additional unit such as an existing servo control unit, or one called for by the type of towing vehicle involved, such as power steering or a hydraulic lifting system in the case of farm tractors for example. A control system according to the invention is particularly useful in cases where the towing vehicle braking system is of the customary hydrostatic type or dispenses with a so-called "open-centre" fluid circuit as used here for braking the trailer in addition to powering one or more slave units.

The invention relates more particularly to a system which, notwithstanding these requirements, is preferably designed so that the intensity with which the trailer is braked remains dependent upon the intensity with which the towing vehicle is braked, and so that the function of braking the trailer should have priority over the other slave unit or units and remain unaffected by operation thereof and have no significant influence thereon.

The present invention accordingly relates essentially to a system for controlling the braking of a vehicle trailer by means of an open-centre type pressurized fluid circuit which is independent of the towing vehicle braking system and includes at least one additional servo unit, said towing vehicle braking system comprising an element which is movable as a function of the towing vehicle braking control pressure and operates a slide-valve type distributor supplying the trailer braking system and said additional servo unit, the subject system of the invention being characterized in that said distributor includes a slide cooperating through one of its ends with a thrust spring subjected to the action of said movable element of the towing vehicle braking system and, through its other end with a second spring urging it into contact with said thrust spring, said slide having two valve faces separated by an annular groove into which said open-centre circuit pressurizing source has continuous port, the first of said valve faces being disposed on the same side as said second spring and cooperating with a first groove formed in the distributor valve body and continuously communicating with the trailer braking circuit, the second of said valve faces being disposed on the same side as said thrust spring and cooperating with a second groove in the valve body communicating with said servo unit, said valve faces being devised so that when the distributor slide is inoperative (no pressure on said thrust spring) said first valve face cuts off communication between said annular groove and said first groove but allows the latter to communicate with a discharge passage, said second valve face allowing said annular groove to communicate with said second groove, and so that when said slide shifts responsively to said thrust spring upon braking of the towing vehicle, said first valve face masks said discharge passage and then places said annular groove in communication with said first groove while said second valve face positions itself to constrict fluid flow between said annular groove and said second groove, said slide being additionally formed with a reaction area which is subjected to the fluid pressure applied to the trailer braking system and which biases said slide oppositely to said thrust spring, whereby the braking pressure applied to the trailer is made dependent upon that applied to the towing vehicle brake circuit.

Figure 2:
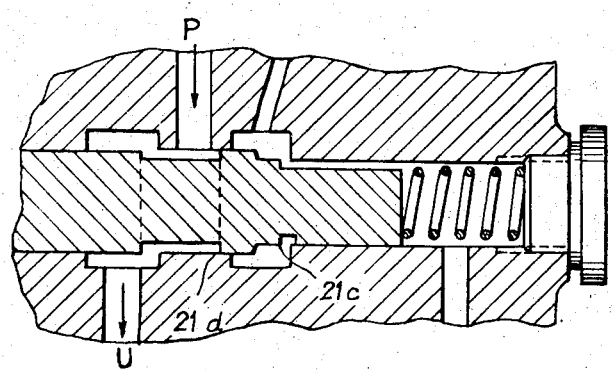

One possible form of embodiment of the control system of the present invention will now be more particularly described with reference to the accompanying non-limitative exemplary drawing, in which:

FIGURE 1 is a schematic illustration of the subject system of the invention, showing the distributor slide-valve unit in axial section, and FIGURE 2 is a fragmental view of an alternative form of embodiment of the distributor unit.

The trailer braking system shown in FIGURE 1 includes a slide-valve distributor unit adapted to be mounted on the towing vehicle and having sliding through the valve body 1 thereof a slide 2 having a control unit 3 fitted to one of its ends.

Control unit 3 comprises a piston 4 movable in a cylinder 5 designed to be connected as at 6 to the towing vehicle brake circuit (not shown). This brake circuit may be of the hydraulic type for instance and comprise the usual master cylinder; in this case it is shown as feeding the cylinder 5 (arrow F$t$) in addition to the brake cylinder or cylinders used on each wheel.

The following connections are made from the slide-valve distributor:

(a) Through a passage 7 to a pressure source in the form of a pump (not shown), the function of which is symbolized by the feed arrow P.

(b) Through a passage 8 to a slave unit symbolized by the rectangle U and consisting, in the case of a farm tractor for example, of the customary farming implement hoist system.

(c) Through a passage 10 to the trailed brake control units (not shown) (arrow F$r$), for instance via a direct feed line to the trailer brake units, or via a line feeding a control relay designated for connection to a braking system specific to the trailer.

(d) Through a passage 11 to a reservoir 12 which supplies the pressure source and into which is also discharged the fluid flowing through the servo unit, this circuit as a whole controlled by the slide-valve distributor being of the so-called "open-centre" type.

The control piston 4 includes a rod about which is placed a thrust spring 13 applied against slide-valve 1 and positioned between two washers 14, 15 slidably mounted on said rod. Washer 15 cooperates with the slide and is retained on the rod by a circlip or the like 16, and it is to be noted that spring 13 can be precompressed between said washers if desired. The other end of slide 1 is acted upon by a return spring 17.

Return spring 17 is shown as being mounted about a rod 18 carrying a washer (against which the spring reacts) and slidably engaging into a valve chamber 19 the purpose of which will be explained hereinafter. Rod 18 is restrained axially by a threaded plug 20.

Slide 2 is formed with two valve faces 21, 22 separated by an annular groove 23 into which passage 7 extends. Valve face 21 cooperates with a groove 24 in valve body 1 communicating with passage 10. Valve face 22 cooperates with a groove 25 in valve body 1 communicating with passage 8.

Chamber 19 communicates permanently with groove 24 through a passage 26 formed within the slide. Slide 2 is also formed with an indent 27 beyond valve face 21, through the medium of which groove 24 can communicate, via an end chamber 28 in the valve body, with discharge passage 11. Also communicating with passage 11 is a passage 29 for discharging any fluid that leaks into the other valve end chamber 30.

The subject system of the invention operates in the following manner: when the towing vehicle brake circuit is inoperative, i.e. when there is no pressure in chamber 5, the slide-valve is urged into the inoperative position (shown in the drawing) by return spring 17.

In this inoperative position, valve face 21 prevents groove 23 from communicating with groove 24, and valve face 22 allows groove 23 to communicate with passage 8; in other words, servo unit U can be operated at will whereas the trailer brake control units (arrow Fr) remain unresponsive to any pressure variations occurring between source P and servo unit U in the event of operation of the latter.

In the inoperative configuration, furthermore, the shoulder 21a of valve face 21 unmasks groove 24, so that the trailer brake control units communicate with the discharge passage.

When the trailer is braked, cylinder 5 is supplied with fluid at a pressure dependent upon the braking force exerted by the driver of the towing vehicle. Control piston 4 is then moved rightwardly of the drawing and, via thrust spring 13, shifts valve slide 2 in the same direction.

The following three operations take place successively in a very short time:

(1) Shoulder 21a of valve face 21 blocks communication between groove 24 and indent 27, thus cutting off communication between the discharge passage and the trailer brake control units connected to passage 10.

(2) Shoulder 21b of valve fare 21 unmasks groove 24 and thereby places it in communication with groove 23, i.e. with the pressure source.

(2) Shoulder 21b of valve face 22 blocks communication between grooves 23 and 25, i.e. between the pressure source and the servo unit U.

Assuming, firstly, that servo unit U was not operative when the trailer was braked, i.e., that the fluid issuing from pressure source P was then flowing without significant pressure to servo unit U and reservoir 12, then construction of the passageway between grooves 23 and 25 will cause a pressure rise in the fluid upstream of shoulder 22a and consequent feeding under pressure of the trailer brake control units (arrow Fr) and the chamber 19 within slide 2. The section of chamber 19 thus operates on slide 2 as a reaction area sensitive to the pressure applied to the trailer brake control units, so that there is exerted on slide 2, in opposition to the thrust exerted on it by spring 13 and independently of the thrust exerted by return spring 17, a thrust which increases with the pressure applied on the brake control units and which tends to thrust slide 2 leftwardly. It will be manifest that this leads to a state of equilibrium of the slide, which moves into stability in a position wherein communication between grooves 23 and 25 is cut off so as to create a pressure which is applied to the trailer brake units and depends on the degree of compression of thrust spring 13. The braking force on the trailer thus becomes a function of the braking force on the towing vehicle. On the other hand, should it be desired to set a limit to the braking force exertable on the trailer, all that is necessary is to limit the degree of compression of thrust spring 13 responsively to piston 4. Provision for this exists in the exemplary form of embodiment shown in the drawings, and is achieved by causing washer 14 to abut against the valve body 1 after piston 4 has completed part of its stroke.

It will next be assumed that servo unit U was operative when the trailer was braked and that a certain pressure already prevailed between the pressure source and servo unit U.

If this existing utilization pressure is greater than that called for to brake the trailer, the distributor slide-valve will operate as a pressure reducer in supplying the trailer brake control units. This functional mode thus differs from the one previously discussed in that when shoulder 21b has unmasked groove 24 and the pressure applied to the trailer brake units becomes enough to overcome (through the reaction area of chamber 19) the force exerted by thrust spring 13 on slide 2, the latter is moved leftwardly up to the position in which shoulder 21b cuts off communication between grooves 23 and 24. In other words, the pressure applied to the trailer brakes is still a function of the braking pressure applied to the towing vehicle but is this time independent of a possibly higher pressure prevailing between the pressure source and the servo unit U.

When servo unit U is operative and the pressure required by it is less than the pressure required to brake the trailer, the system operates anew in the first mode discussed, except that the constriction in the fluid flow caused by shoulder 22a in order to raise the pressure upstream thereof is now required to introduce a pressure loss which is equal, not to the pressure required to brake the trailer, but merely to the difference between the latter-mentioned pressure and the previously existing and subsidiarily maintained utilization pressure of servo unit U.

FIGURE 2 is intended to illustrate the fact that said chamber reaction area can be formed otherwise than by recourse to a chamber within the slide itself, a notable example being by imparting a stepped form to the distributor valve body and to the slide valve-face equivalent to the valve face 21 referred to precedingly, with the slide shoulder 21c being of smaller diameter than shoulder 21d, whereby said reaction area is caused to be equal to the cross-sectional difference between these shoulders.

It goes without saying that many substitutions and changes of parts may be made without departing from the spirit and scope of the invention. By way of example, in the case of a towing vehicle equipped with a mechanical brake actuating system, the hydraulic control piston 4 could be replaced by a mechanical component adapted to exert variable force on the distributor slide in the same direction.

What is claimed is:

1. A system for controlling the braking of a vehicle trailer by means of an open-centre type pressurized fluid circuit which is independent of the towing vehicle braking system and includes at least one additional servo unit, said towing vehicle braking system comprising an element which is movable as a function of the towing vehicle braking control pressure and operates a slide-valve type distributor supplying the trailer braking system and said additional servo unit, characterized in that said distributor includes a slide cooperating through one of its ends with a thrust spring subjected to the action of said movable element of the towing vehicle braking system and through its other end, with a second spring urging it into contact with said thrust spring, said slide having two valve faces separated by an annular groove into which said open-centre circuit pressurizing source has continuous port, the first of said valve faces being disposed on the same side as said second spring and cooperating with a first groove formed in the distributor valve body and continuously communicating with the trailer braking circuit, the second of said valve faces being disposed on the same side as said thrust spring and cooperating with a second groove in the valve body communicating with said servo unit, said valve faces being devised so that when the distributor slide is inoperative (no pressure on said thrust spring) said first valve face cuts off communication between said annular groove and said first groove but allows the latter to communicate with a discharge passage, said second valve face allowing said annular groove to communicate with said second groove, and so that when said slide shifts responsively to said thrust spring upon braking of the towing vehicle said first valve face masks said discharge passage and then places said annular groove in communication with said first groove while said second valve face positions itself to constrict fluid flow between said annular groove and said second groove, said slide being additionally formed with a reaction area which is subjected to the fluid pressure applied to the trailer braking system and which biases said slide oppositely to said thrust spring, whereby the braking pressure applied to the trailer is made dependent upon that applied to the towing vehicle brake circuit.

2. A control system according to claim 1, wherein said movable element of the towing vehicle braking system is a piston subjected to the pressure prevailing in the towing vehicle brake circuit.

References Cited

UNITED STATES PATENTS 3,198,585  8/1965  Bullard _____ 303—7

FOREIGN PATENTS 600,949  4/1948  Great Britain.

MILTON BUCHLER, *Primary Examiner.*

J. McLAUGHLIN, *Examiner.*